March 16, 1965  S. BEIMFOHR  3,173,374
BEARING FOR PUMPS AND MOTORS
Filed Dec. 31, 1962
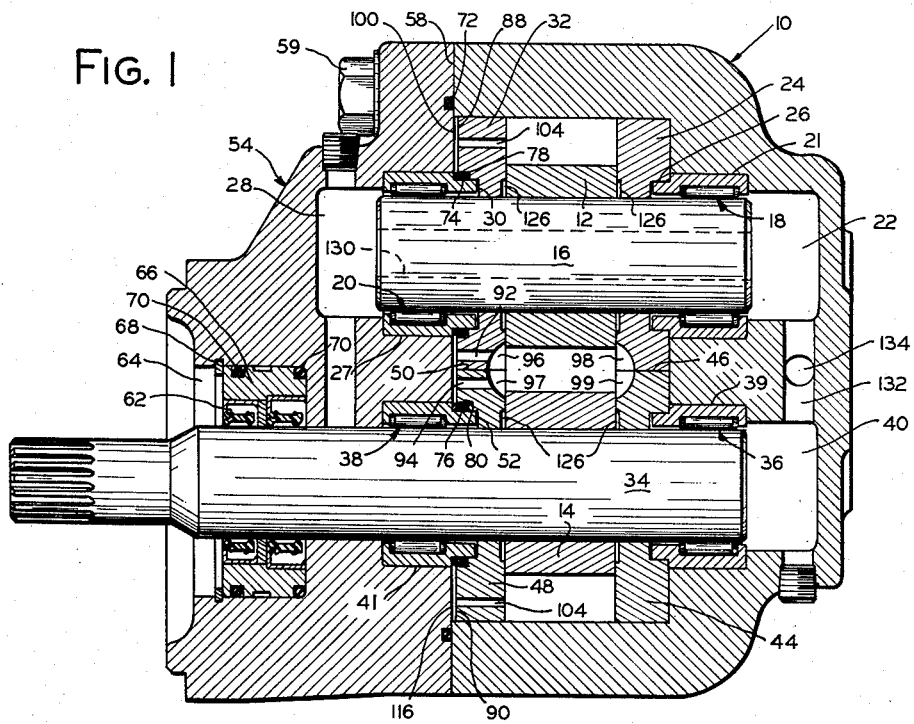
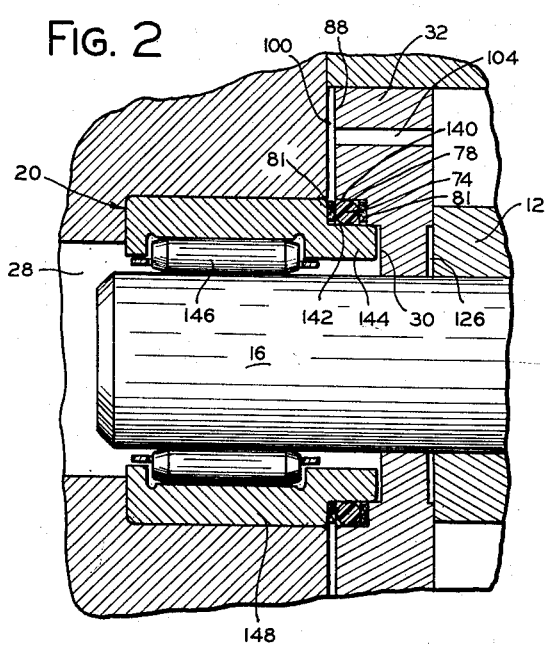
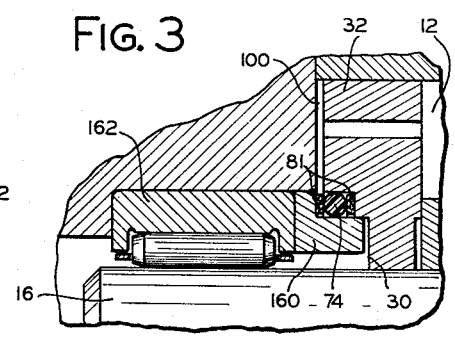
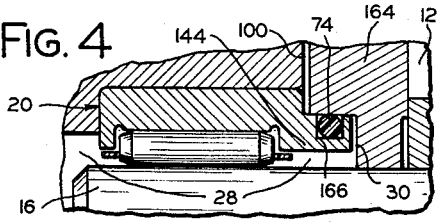
INVENTOR
SIEGFRIED BEIMFOHR
BY J.C. Wiessler
ATTORNEY United States Patent Office 3,173,374
Patented Mar. 16, 1965

3,173,374
BEARING FOR PUMPS AND MOTORS
Siegfried Beimfohr, St. Joseph, Mich., assignor to Clark Equipment Company, a corporation of Michigan
Filed Dec. 31, 1962, Ser. No. 248,650
1 Claim. (Cl. 103—126)

This invention relates to bearings for pumps and motors, more particularly to an improved bearing construction for hydraulic pressure loaded gear pumps and motors.

In gear pumps and motors of the general type disclosed in copending application Serial No. 158,362, filed December 11, 1961, now Patent No. 3,137,238, in the name of Richard O. Gordon (common assignee), it has been found that the roller bearings supporting the rotating gear shafts of the pump or motor (hereinafter sometimes referred to as "pump" for the sake of convenience) enjoy only a relatively short life, and must be frequently replaced. As a result of short bearing life, serious maintenance problems and costly repairs have become rather common in such pressure loaded pumps.

Heretofore in pressure loaded gear pumps of the type contemplated, it has been common practice to utilize roller bearings having an outer tubular race with each bearing mounted by a shrink fit process in a cavity of the pump body housing and extending into an inner annular recess in one of the pressure loaded or fixed thrust plates which sealingly engages one of the side faces of the gears to prevent fluid leakage from the discharge side of the pump back to the inlet thereof. Sealing means have been provided between each pressure loaded thrust plate and the outer periphery of the corresponding bearing race which establishes the effective area of the axially movable thrust plate which is subject to discharge pressure for sealing the one side face of each gear. Such a combination of pump housing, thrust plate and bearing means is disclosed in the aforementioned application.

It has been found that that portion of the bearing which has heretofore been in overhanging relation to the pump body is subject to deflection in a radial direction, which shortens bearing life. Furthermore, the diameter or load carrying capacity of each bearing which could heretofore be used in such pumps was limited by the thrust plate area required to be subjected to pumping pressure for sealing the side faces of the gears. This limitation in design frequently resulted in the use of bearings of smaller capacity than should be used to obtain satisfactory operation of the pump for relatively long periods of time.

I have found that by utilizing my improved bearing design the prior problems of bearing deflection and overloading are eliminated, and that the bearing load capacity may be selected, within limits, independently of the surface area requirements of the thrust plate. At the same time my construction provides a suitable seal between the thrust plate and bearing so that no undesirable leakage from the thrust plate pressure chamber occurs. Thus, my improved bearing design affords the pump or motor designer a much greater degree of flexibility in the selection of bearing size than heretofore, while avoiding serious problems previously encountered in such pumps and motors.

It is therefore a primary object of the present invention to provide an improved bearing for pumps and motors of certain types.

It is another important object of this invention to provide in such pumps and motors a bearing which is wholly and rigidly supported by the housing, and an extension of the bearing which forms sealing means with other internal parts of the pump or motor.

Another object of the invention is to provide in such pumps and motors a significantly improved bearing construction which in combination with other parts of the pump or motor provides a unit having longer life than heretofore.

Another object is to provide an improved bearing for pressure loaded gear pumps and motors having a relatively large bearing race and a relatively small bearing extension cooperating with a pressure loaded thrust plate for sealing pressure fluid which motivates the thrust plate.

A further object of the invention is to provide a pump or motor construction which is flexible in design to meet different operating requirements.

Other objects and advantages of the present invention will become apparent from the following detailed description thereof taken in conjunction with the drawings wherein:

FIGURE 1 is a longitudinal sectional view of a pressure loaded type, intermeshing gear pump in accordance with a preferred embodiment of the present invention;

FIGURE 2 is an enlarged sectional view of a portion of the pump illustrated in FIG. 1 showing in greater detail the bearing construction of my invention;

FIGURE 3 is a partial view in section showing a modification of the bearing construction of FIG. 2; and FIGURE 4 is a partial view in section showing another modification of the bearing construction of FIG. 2.

Referring now in detail to the drawing, numeral 10 denotes a suitably chambered gear pump housing in which are rotatably mounted a driven gear 12 and an intermeshing driving gear 14. Driven gear 12 is supported on a shaft 16 journaled at its right end in a roller bearing 18 and at its left end in a roller bearing 20. Roller bearing 18 is located in a recess 21 formed in the housing and is associated with a fixed thrust plate 24 located intermediate bearing 18 and gear 12 which provides an annular recess 26 in registry with a left end flange portion of the bearing. Bearing member 20 is located in annular housing chamber 27, and a right end flange portion of the bearing is located in registry with an annular recess 30 of an axially movable or floating thrust plate 32 intermediate the bearing and the one side face of gear 12. Driving gear 14 is mounted for rotation upon a drive shaft 34 journaled at its right and in a roller bearing 36 and intermediate its ends in a roller bearing 38, said roller bearings being mounted in chambers 39 and 41, respectively, and in registry with recesses in plates 44 and 48, in a manner similar to the mounting of bearings 18 and 20. Details of the construction of the roller bearings will appear hereinafter. A fixed thrust plate 44 is mounted intermediate gear 14 and bearing 36 in a manner similar to the mounting of thrust plate 24, said plates 24 and 44 mating in sealing relationship along complementary flat surfaces thereof indicated at numeral 46. An axially movable or floating thrust plate 48 is mounted intermediate gear 14 and bearing 38 in a manner similar to the mounting of movable thrust plate 32, said movable thrust plates abutting in sealing relationship along complementary flat surfaces thereof as indicated at numeral 50. Additional details of the construction of thrust plates 32 and 48 are disclosed in detail and claimed in the aforementioned copending application.

A cover body 54 having a mating surface 58 is secured to the pump body 10 by means of a plurality of bolts, one of which is shown at numeral 59. Shaft sealing means 62 is located in an enlarged chamber 64 of cover body 54 between a seal retainer member 66, shaft 34, and a portion of the cover body 54. A snap ring 68 locates seal retainer 66 in chamber 64. A plurality of O-rings are mounted in annular grooves formed in various parts of the pump construction to provide sealing means. The O-rings 70 provide a seal between the retainer member 66 and cover body 54; O-ring 72 provides a seal between the pump body 10 and the cover body 54; O-rings 74 and 76 are located in recesses 78 and 80 of thrust plates 32 and 48, respectively, and provide seals between the thrust plates and flanged portions of the bearing members 20 and 38, respectively. A fibre back-up ring 81 is located between each O-ring 74, 76 and the adjacent bearing and thrust plate for maintaining the O-rings in position.

Inlet and outlet conduits, not shown, are formed in the pump body 10 for conducting hydraulic fluid from the sump to the intermeshing gears 12 and 14, and for conducting high pressure fluid generated by the gears from the discharge side of the pump to any suitable working device. The discharge pressure fluid is also directed from the high pressure side of gears 12 and 14 to rear or motive surfaces 88 and 90 of thrust plates 32 and 48, respectively, through openings 92 and 94 in the thrust plates which open into discharge trapping recesses 96 and 97 formed in the forward or sealing side surfaces of the thrust plates at the discharge side of the pump. Similar trapping recesses 98 and 99 are formed in the sealing side surfaces of fixed thrust plates 24 and 44. These recesses insure continuous communication of openings 92 and 94 with full discharge pressure.

Pressure chamber 100 is formed between surface 58 of cover body 54 and the rear surface 88 of thrust plate 32, and pressure chamber 116 is formed between the cover body and the rear surface 90 of thrust plate 48. One or more pressure gradient openings 104 are located in each of thrust plates 32 and 48 radially outwardly of the root diameter of the teeth of gears 12 and 14 so that said openings and chambers 100 and 116 are adapted to communicate continuously with pressure fluid generated in the gear teeth pockets in the area of each opening 104 for helping to insure pressure balanced thrust plates during operation of the pump, as disclosed in detail in the aforementioned copending application.

An annular recess 126 is formed inwardly of the root diameter of the sealing surface of each of fixed thrust plates 24 and 44 and of movable thrust plates 32 and 48 for the purpose of relieving galling and burning of the metal of the thrust plates and gear side faces in these areas. Any pressure fluid which leaks between the gear side faces and the thrust plate sealing surfaces during operation flows along the shafts 16 and 34 through the various bearing members and is collected in chambers 22, 28 and 40 and thence vented back to the pump inlet through passageways 130, 132 and 134.

Certain structure which is a part of the pump as produced is not disclosed herein since such other structure is unnecessary to a complete understanding of the present invention. Suffice it to say for the present purpose that high pressure fluid which is generated by the pump, or which is received by the device when it is used as a motor, is communicated through the high pressure openings to thrust plate chambers 100 and 116 and that the resulting pressure force applied to the motive surfaces 88 and 90 of the thrust plates, compensated as required to impose a balanced sealing force against the side faces of gears 12 and 14 by such means as pressure gradient openings 104, is continuously effective during operation of the pump or motor to seal the same from any substantial amount of leakage, whereby to tend to maximize its efficiency and to facilitate the construction of high pressure gear pumps and motors operable at pressures of 2500 p.s.i. and above.

In a pump or motor of the type contemplated of any given pressure-volume characteristic having gears of predetermined size and design, it will be apparent to persons skilled in the art that the effective area of motive surfaces 88 and 90 is critical and must be maintained in order to provide sufficient, but not too large, sealing force between the side surfaces of gears 12 and 13 and the mating surfaces of the thrust plates. This design criterion, therefore, largely determines the proper diameter of annular recesses 30 and 52 in thrust plates 32 and 48. The thrust plates are designed to provide running clearance with the respective shafts 16 and 34, and must provide for a seal so that pressure fluid which is trapped in motive pressure chambers 100 and 116 cannot escape through the bearings and along the respective shafts. Thus, as shown in FIG. 2, O-ring 74 is located in annular groove 78 of thrust plate 32 between radially spaced annular surfaces 140 and 142 of the thrust plate and of an axially extending annular flange portion 144 of bearing 20, respectively, thus preventing high pressure fluid from escaping from chamber 100 into low pressure chamber 28 by way of thrust plate recess 30 and along the passages formed circumferentially of shaft 16 through rollers 146 of bearing 20.

Bearing 20 is mounted in housing chamber 27 with a shrink or press fit so that the race 148 of the bearing is in fluid sealed relation with the annular surface of chamber 27. It is important to note that bearing 20, including rollers 146 journaling the shaft, is located entirely within housing portion 54 so as to provide maximum rigidity for the bearing in respect of radial loads imposed thereon which may result from any degree of dynamic unbalance of the pump or from the inherently high radial loadings which normally are encountered in operation of such pumps, the latter being a consequence of the fluid pressure differential which acts radially of the gears during operation. In addition to making provision for maximum supporting rigidity for the bearing, my invention also allows a bearing to be used of significantly larger size than provided heretofore in constructions utilizing bearings having a diameter equal to the diameter of bearing flange portion 144. Significant flexibility in design is provided by my invention in that as design requirements vary for different pumps and motors, the relationship of the diameter of bearing flange portion 144 to the diameter of the bearing portion 146, 148 may be varied, within limits, so as to provide an ideal bearing size for a particular unit while at the same time permitting the required critical motive surface area 88 to be embodied in the pump. In other words, bearing design flexibility inheres in the fact that the ratio of the diameters of the bearing to the flange is variable, within determinable limits, so as to provide an ideal combination of bearing size to thrust plate motive surface area, while utilizing an arrangement which includes the thrust plate and bearing flange for sealing the motive pressure chamber from communication with the inlet of the pump. To state this in yet another way, my invention permits the bearing to be precisely tailored to the particular requirements of the pump without requiring that the thrust plate motive surface area be established by compromised design criteria such as undersized bearings in combination with a thrust plate motive surface area less than the optimum area. Extensive tests of my invention indicate that pump life is greatly improved, less maintenance of the pump is required, optimum thrust plate motive surface area is readily effected, and over-all pump efficiency is improved.

It will be understood that the construction of bearings 18, 36 and 38, as shown, is the same as that of bearing 20, described above in detail, although the bearings need not necessarily be of the same construction in practice.

A modification of the foregoing embodiment is shown in FIG. 3, wherein similar parts have been numbered the same as in FIG. 2. The only difference between the two embodiments of the bearing construction is that in FIG. 3 a separate L-shaped insert or flanged member 160 is utilized with bearing 162 and performs with the bearing and pump in functionally the same manner as the integral flange portion 144 of bearing 20. The integral bearing design of FIG. 2 is more economical to produce, and for this and other reasons the FIG. 2 embodiment of the bearing construction is preferred.

Another modification of the bearing construction is shown in FIG. 4 wherein similar parts have been numbered the same as in FIG. 2. In FIG. 4 thrust plate 164 does not include an O-ring recess 78; rather, an annular recess 166 is formed in bearing flange 144 for receiving O-ring 74. This is of advantage in that partial support of the O-ring is not dependent on a fibre ring 81, as in FIG. 2; possible extrusion of the O-ring into chamber 28 is thereby avoided by positively trapping the O-ring between the axially and radially spaced sides of groove 166 and plate 164.

It will be understood by persons skilled in the art that certain changes and modifications in the structure and relative arrangement of parts may be made without departing from the scope of my invention.

I claim:

In a pump or the like comprising a housing containing a pair of intermeshing gears, a pair of shafts supporting said gears and extending axially outwardly thereof in both directions, a sealing plate member on at least one side of each gear for sealing the adjacent side face of the gear and mounted on the shaft of said gear, a pair of cavities in said housing each opening toward one of said plate members and substantially coaxial with one of the shafts, a recess in each plate member in opposed relation to one of said cavities, a pair of anti-friction bearing means journaling the shafts each including a load-carrying portion and an annular flange portion encircling the shaft, each bearing means being disposed with the load-carrying portion located substantially completely in one of the cavities for rigid support by the housing and with the flange portion extending into the respective opposed recess, and sealing means between each flange portion and the adjacent plate member, each flange portion having its inner surface spaced from the shaft encircled thereby.

References Cited in the file of this patent
UNITED STATES PATENTS

| | | |
|---|---|---|
| 2,044,873 | Beust | June 23, 1936 |
| 2,527,941 | Lauck et al. | Oct. 31, 1950 |
| 2,682,836 | Orr | July 6, 1954 |
| 2,695,566 | Compton | Nov. 30, 1954 |
| 2,714,856 | Kane | Aug. 9, 1955 |
| 2,864,315 | Udale | Dec. 16, 1958 |
| 2,881,704 | Murray | Apr. 14, 1959 |
| 2,932,254 | Booth et al. | Apr. 12, 1960 |
| 3,000,323 | Park et al. | Sept. 19, 1961 |